L. E. CLAWSON.
CUSHIONING DEVICE AND SUPPORT FOR VEHICLE FRAMES.
APPLICATION FILED APR. 12, 1920.
1,390,021.
Patented Sept. 6, 1921.
3 SHEETS—SHEET 2.
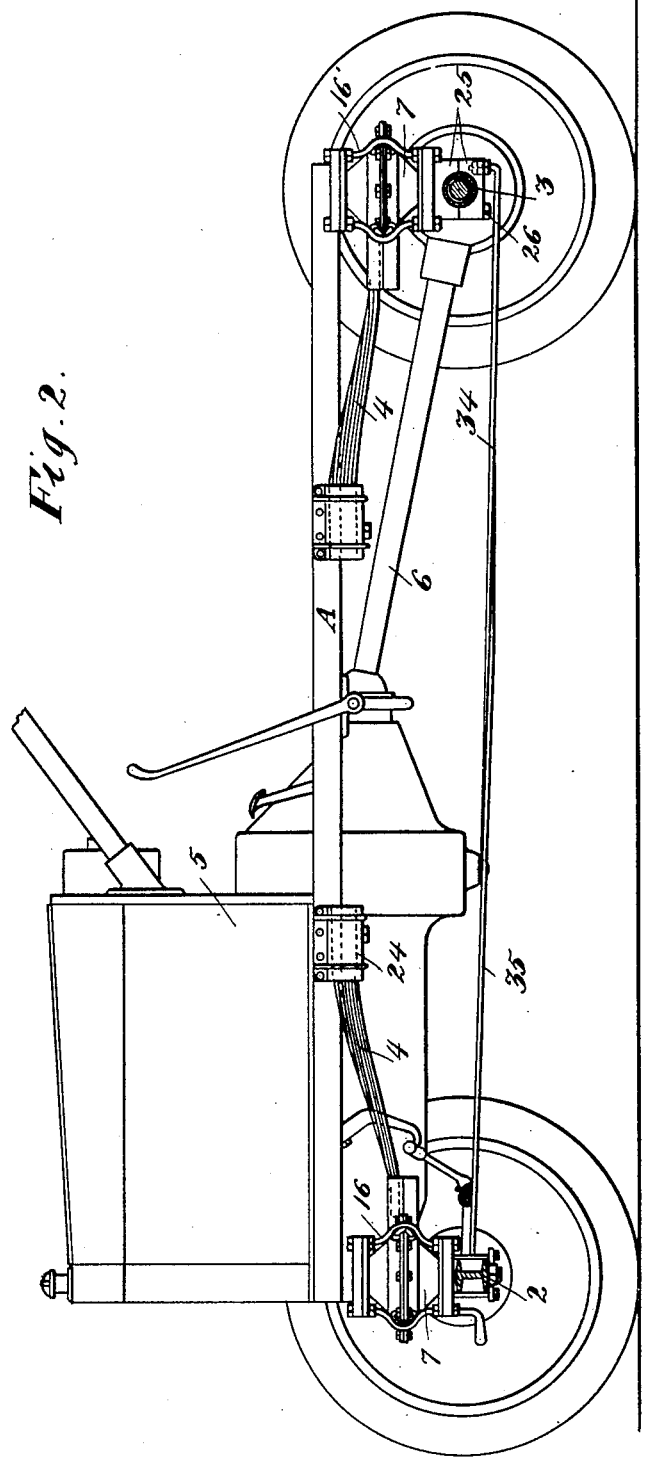
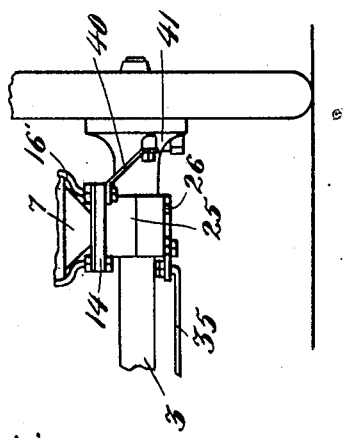
INVENTOR
L. E. Clawson.
BY
Chas. E. Townsend
ATTORNEY.

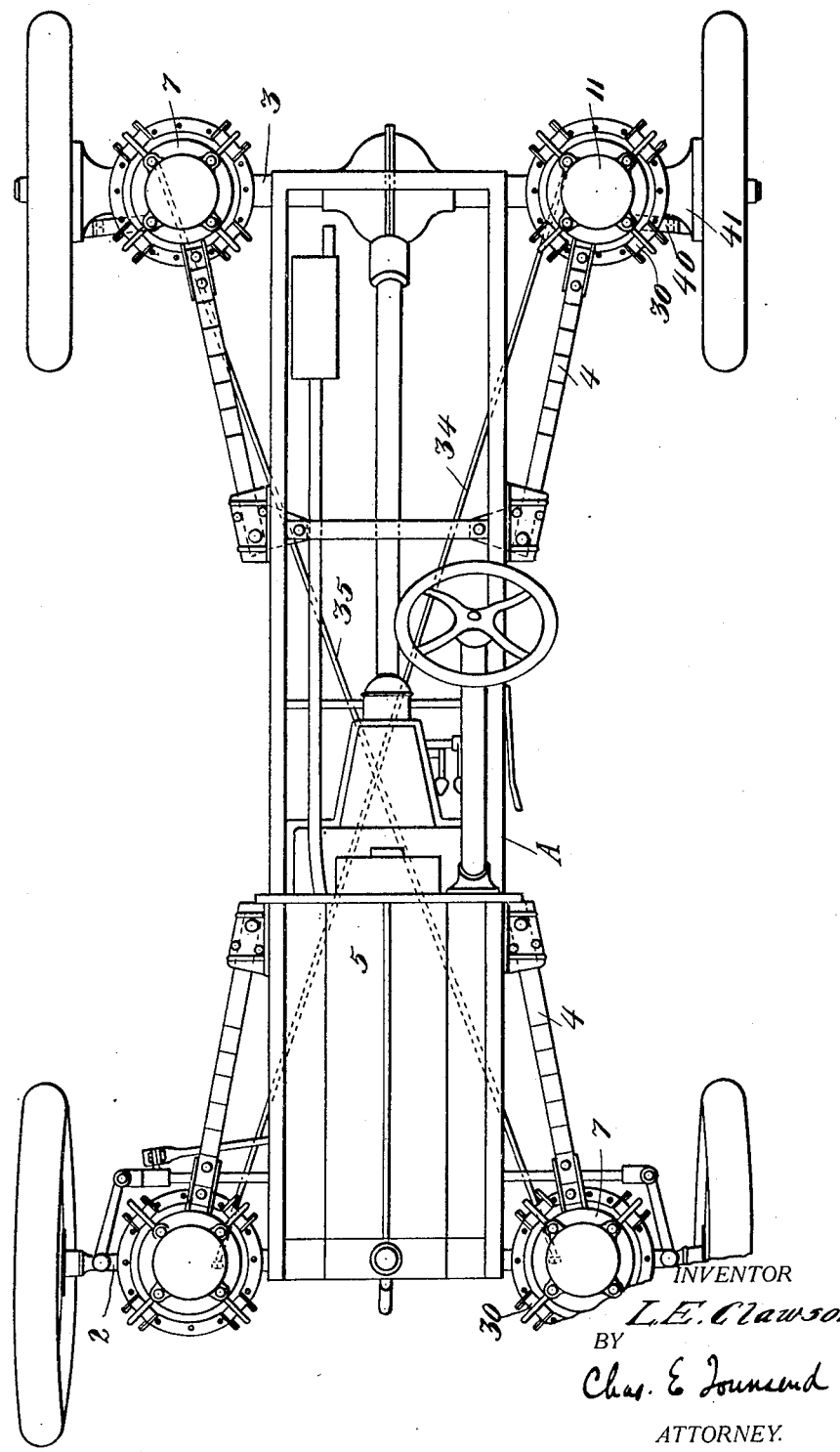

L. E. CLAWSON.
CUSHIONING DEVICE AND SUPPORT FOR VEHICLE FRAMES.
APPLICATION FILED APR. 12, 1920.

1,390,021.

Patented Sept. 6, 1921.
3 SHEETS—SHEET 3.

INVENTOR
L. E. Clawson,

BY

ATTORNEY.

UNITED STATES PATENT OFFICE.

LEONARD E. CLAWSON, OF SAN FRANCISCO, CALIFORNIA.

CUSHIONING DEVICE AND SUPPORT FOR VEHICLE-FRAMES.

1,390,021.      Specification of Letters Patent.     Patented Sept. 6, 1921.

Application filed April 12, 1920. Serial No. 373,180.

*To all whom it may concern:*

Be it known that I, LEONARD E. CLAWSON, a citizen of the United States, residing at the city and county of San Francisco, and State of California, have invented a new and useful Improvement in Cushioning Devices and Supports for Vehicle-Frames, of which the following is a specification:

This invention relates to a cushioning device and support for vehicle frames and especially to a device suitable for automobiles and like motor driven vehicles.

Most automobiles in use today, having a spring supported chassis, are provided with numerous devices to protect the occupants against shocks and vibrations produced by the wheels encountering irregularities in the road surface. Among such devices may be mentioned expensively upholstered seats, resilient cushions, hydraulic checks, shock absorbers, etc. These all do their share toward producing the desired result, but are at their best only partially effective.

The object of the present invention is to provide a cushioning device and support for vehicles of the character described, which is capable of more efficiently absorbing shocks and vibrations resulting from the movement of a vehicle over a road surface, and especially to provide means whereby all metallic connections are broken between the running gear and the frame.

Another object of the invention is to provide a resilient member which forms a universal connection between the axles and springs and which is capable of absorbing longitudinal, lateral and vertical shocks and vibrations.

Another object of the invention is to provide a novel arrangement of truss rods whereby parallelism is maintained between the axles and a limited movement permitted between the axles and frame.

Further objects will hereinafter appear.

The invention consists of the parts and the construction, combination and arrangement of parts as hereinafter more fully described and claimed, having reference to the accompanying drawings, in which—

Figure 1 is a plan view of a vehicle showing the application of the invention.

Fig. 2 is a side elevation of Fig. 1.

Fig. 3 is a rear end detail view showing the connection between the truss rods and the rear axle, and also one of the connections made between the resilient support and the axle.

Figure 4:
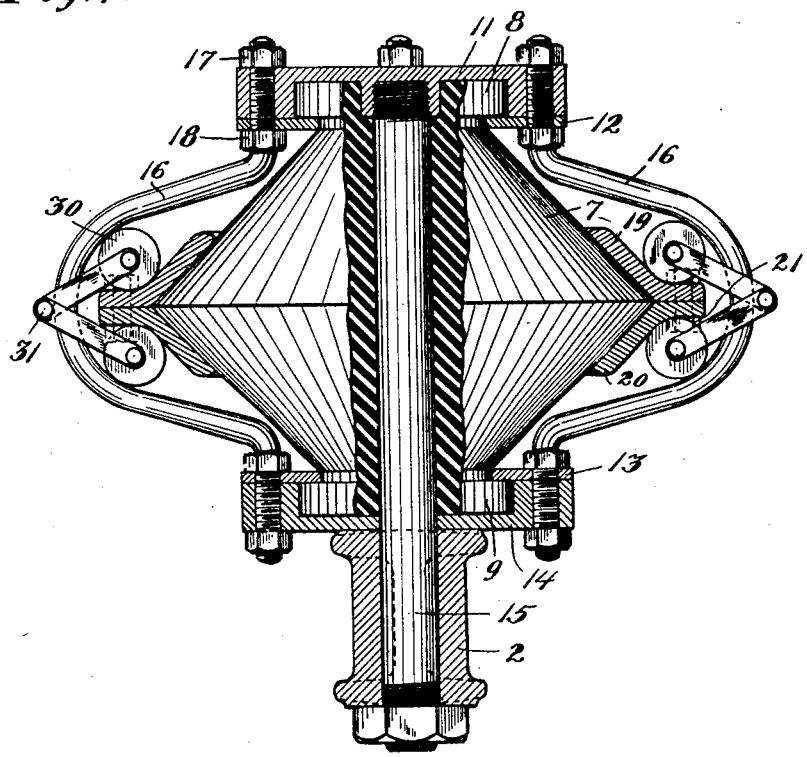
Fig. 4 is a central vertical section of one of the resilient supports.

Referring to the drawings in detail, A indicates the main frame of a vehicle, 2 the front axle, 3 the rear axle, 4 the springs whereby the frame is supported with relation to the axles, 5 the engine, and 6 the propeller shaft. Interposed between each spring, or forming a connection between the same and the axles, is a resilient member 7. There are four such members employed, one at each end of each axle. By referring to Fig. 4 the construction of the same will be seen. Each resilient member is preferably constructed of rubber or like resilient material, and while they may be spherical or otherwise shaped, I prefer a double cone shape such as shown. Each member is provided with an upper and a lower head section such as indicated at 8 and 9. These head sections are clamped between plates 11, 12, 13 and 14. The lower plate 14 is perforated to receive a centering bolt 15 which extends through the resilient member and is secured to the upper plate 11 by means of a threaded connection as shown. The bolts 15 are only employed in connection with the resilient members interposed between the front axle and front springs and they serve two functions: first that of partially compressing each resilient member to increase or decrease the resiliency of the same, and secondly that of securing each resilient member against undue movement, whether longitudinally, vertically or laterally. Each resilient member is further secured with relation to the bolts 15 and the front axle 2 by means of U-bolts 16 which are also capable of partially compressing the resilient members 7; this being due to the fact that the bolt ends are threaded and nuts are positioned on each side of the respective plates 11, 12, 13 and 14, as indicated at 17 and 18.

Figure 5:
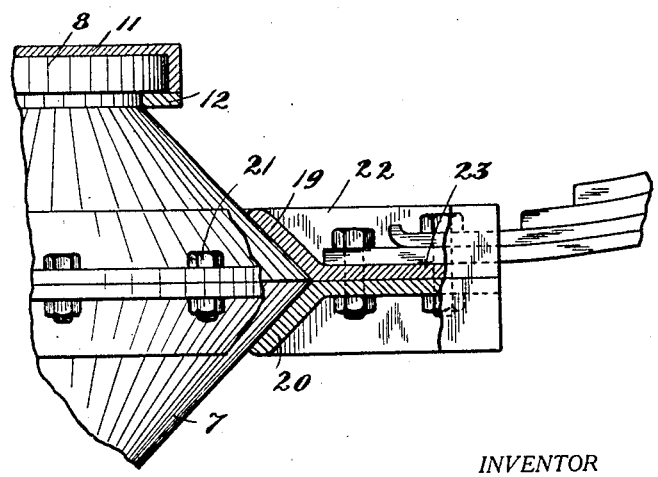
Fig. 5 is a detail section taken at right angles to Fig. 4, and showing the connection between the spring and the resilient support.

One of the features of the present invention is the breaking of all metallic connections between the main frame and the running gear, and especially between the springs and the axles. By referring to Figs. 2, 4 and 5, it will be seen that the resilient members 7 are surrounded by a pair of annular flanged ring shaped plates 19 and 20. These plates surround the respective resilient members where their diameter is largest and they are rigidly clamped and secured thereto by means of bolts 21. The respective plates are provided with an extension as at 22 and the front springs are secured thereto as at 23. In other words the springs are entirely supported at one end by the resilient members and these are in turn secured to the axle by the bolts 15 and 16. All metallic connection is thereby broken between the springs and the axle and a limited universal movement is at the same time permitted between each spring and the axle due to the compressibilty of the resilient members in all directions, and particularly when considering longitudinal, vertical and lateral movements. The upper ends of the springs are in this instance secured to frame brackets, such as shown at 24, but they may be otherwise secured if desired as this is not of any importance as far as the present invention is concerned.

The resilient members to which the rear springs are connected are secured to the rear axle housing in a different manner from the resilient members disposed on the front axle. This is due to the fact that the bolts 15 cannot extend through the rear axle or housing. I have therefore provided a pair of clamps such as indicated at 25. These clamps are made in two sections. They embrace the entire axle housing and are secured together by means of bolts 26; the bolt 15 being secured to the upper clamp section extends through the resilient member and is secured to the upper plate 11 in a manner similar to that illustrated in Fig. 4. The rear resilient members are otherwise secured by means of bolts 16' and the resiliency of the same may therefore be distributed to a great extent either by the bolts 15 or the bolt 16'.

To further adjust and regulate the compressibility or resiliency of the members 7, I provide a plurality of auxiliary bumpers such as indicated at 30. These bumpers are interposed between the flange plates 20 and the bolts 16. (See Fig. 4.) They are interposed between the upper and the lower plates and are tied together by means of pivotally connected links 31. These links secure the auxiliary bumpers 30 against endwise or lateral movement with relation to the respective bolts 16 and thereby insure against accidental removal or displacement of the same when inserted. The sides of the auxiliary bumpers or members 30 will, to a certain extent, regulate the resiliency of the device as a whole, and again further adjustment may be obtained by making the U-bends of the bolts 16 smaller or larger; further regulation being obtained by tightening the bolts 15 and 16.

From the foregoing description it will be seen that all metallic connection between the springs and the axles is broken as separate means are provided for securing the resilient members to the respective axles, and again separate means for securing or attaching the springs to the respective resilient members. Again a more or less limited universal connection is formed, due to the resiliency of the members 7 and the manner of attaching the springs thereto, that is the resilient members are capable of absorbing vertical, longitudinal and lateral shocks and vibrations, and in fact movement exerted from any direction. There is therefore more or less movement between the axles, the springs and the main frame, and in order to limit this movement to a certain extent and to maintain an absolute parallelism between the front and rear axles, I provide a pair of truss rods 34 and 35. These rods cross each other as shown in Fig. 1, but are otherwise rigidly attached to the respective axles. This manner of connecting the truss rods is exceedingly important as a shock imposed on the front wheels is transmitted through the rods to the rear wheels, and vice versa. The whole strain is therefore distributed on the several resilient members under certain conditions, and again is practically taken up by individual members under other conditions. Head on obstructions, such as depressions extending crosswise of a road surface, are however transmitted to all resilient members in unison, thereby practically relieving the shock or dissipating the same before the main frame is reached.

By referring to Fig. 3 it will be seen that an auxiliary tie rod 40 has been provided. This rod forms a tie between the plate 14 and the brake drum housing 41. It is merely provided for the purpose of preventing accidental turning movement of the clamp sections 25 with relation to the axle housing, which might take place to a limited extent, should the truss rods 34 and 35 become excessively tightened or when they are subjected to certain shocks or strains. The provision of the rods 40 entirely eliminates this danger and to this extent forms one of the important features of the present invention.

While the means employed in this instance for securing the resilient members to the respective axles is here more or less specifically illustrated, and similarly the connection between the resilient members and the springs, I wish it understood that variations in construction and design may be resorted to within the scope of the appended claims; similarly that the materials and finish of the several parts employed may be such as the experience and judgment of the manufacturer may dictate or varying conditions may demand.

Having thus described my invention, what I claim and desire to secure by Letters Patent is—

1. In a motor driven vehicle a main frame, a pair of axles supporting the same, a resilient member forming a universal connection between each end of each axle and the frame, and means for increasing or decreasing the resiliency of said members.

2. In a motor driven vehicle a main frame, a pair of axles supporting the same, springs interposed between each axle and the frame, and a resilient universally movable member forming a non-metallic connection between each spring and axle.

3. In a motor driven vehicle a main frame, a pair of axles supporting the same, a pair of springs interposed between each axle and the frame, a resilient non-metallic member interposed between each spring and each axle, means securing each spring to each resilient member, and other means securing each resilient member to their respective axles.

4. In a motor driven vehicle a main frame, a pair of axles supporting the same, a pair of springs interposed between each axle and the frame, a resilient non-metallic member interposed between each spring and each axle, means securing each spring to each resilient member, and other means securing each resilient member to their respective axles, said securing means forming a resilient non-metallic connection between the springs and the axles.

5. In a motor driven vehicle a main frame, a pair of axles supporting the same, a pair of springs interposed between each axle and the frame, a resilient non-metallic member interposed between each spring and each axle, means securing each spring to each resilient member, other means securing each resilient member to their respective axles, said securing means forming a resilient non-metallic connection between the springs and the axles, and means for adjusting the resiliency of each resilient member.

6. The combination with the main frame of a vehicle and a pair of axles therefor, of a pair of springs interposed between the frame and each axle, a pair of resilient non-metallic members secured on each axle, one at each end thereof, and means for attaching the lower end of each spring to each resilient member and without forming a metallic connection between the springs and the axles.

7. The combination with the vehicle frame and a pair of axles therefor, of a pair of springs interposed between the frame and each axle, a universal connection between the lower end of each spring and each axle, and a pair of tie rods extending from axle to axle.

8. The combination with the vehicle frame and a pair of axles therefor, of a pair of springs interposed between the frame and each axle, a universal connection between the lower end of each spring and each axle, and a pair of crossed tie rods extending from axle to axle and in approximate parallelism with the main frame.

9. A cushioning device and support for vehicle frames comprising a resilient member approximately spherical in shape, means securing said member to the axle of a vehicle, and other means for fastening the springs of a vehicle to said member without making a metallic connection with the axle.

10. The combination with the main frame, the springs and the axles, on a vehicle, of a resilient member secured at each end of each axle and having a limited universal movement with relation thereto, a ring surrounding each resilient member and rigidly clamped thereto without making a metallic connection, and means for securing the lower ends of said springs to the rings.

11. The combination with the main frame, the springs and the axles on a vehicle, of a resilient member secured at each end of each axle and having a limited universal movement with relation thereto, a ring surrounding each resilient member and rigidly clamped thereto without making a metallic connection, means for securing the lower ends of said springs to the rings, and means for adjusting the resiliency of each resilient member.

12. The combination with the main frame, the spring and the axle of a vehicle, of an approximately spherical shaped resilient member, a top and a bottom plate for said member, bolts extending through said plates adapted to compress the resilient member there between, and also adapted to secure it to the axle, ring shaped clamping plates surrounding the resilient member at its largest diameter and clamped thereto without forming a metallic connection with relation to the axle and the bolts securing the resilient member thereto, and means for securing the spring to said ring shaped plates.

In testimony whereof I have hereunto set my hand in the presence of two subscribing witnesses.

LEONARD E. CLAWSON.

Witnesses:
W. W. HEALEY,
M. E. IRVING.